US009667762B1

(12) United States Patent
Takahashi (10) Patent No.: US 9,667,762 B1
(45) Date of Patent: May 30, 2017

(54) ELECTRONIC DEVICE AND METHOD OF MANUFACTURING THE SAME

(71) Applicant: KYOCERA Corporation, Kyoto-shi, Kyoto (JP)

(72) Inventor: Daisuke Takahashi, Neyagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/194,409

(22) Filed: Jun. 27, 2016

(30) Foreign Application Priority Data

Nov. 27, 2015 (JP) ................................. 2015-231247

(51) Int. Cl.
| | | |
|---|---|---|
| *H04M 1/00* | (2006.01) | |
| *H04M 1/18* | (2006.01) | |
| *H04B 1/3888* | (2015.01) | |
| *B29C 65/00* | (2006.01) | |
| *H04B 1/38* | (2015.01) | |
| *B29L 31/34* | (2006.01) | |

(52) U.S. Cl.
CPC ............. *H04M 1/18* (2013.01); *B29C 65/002* (2013.01); *H04B 1/3888* (2013.01); *B29L 2031/3481* (2013.01); *H04B 2001/3894* (2013.01)

(58) Field of Classification Search
CPC .......... H04M 1/02; H04M 1/026; H04M 1/00; H01M 2/1022; H01M 2220/30; H01R 13/5219; H01R 13/73; H01R 13/74; H01R 13/52; G06F 3/0416; G06F 3/044; G06F 2203/04111; G06F 3/041
See application file for complete search history.

(56) References Cited

U.S. PATENT DOCUMENTS 6,149,456 A    11/2000 Uchiyama
7,060,921 B2 *  6/2006 Kubo ................... G03B 17/08
                                              200/293
(Continued)

FOREIGN PATENT DOCUMENTS

JP    H11-339881 A    12/1999
JP    2002-134931 A    5/2002
(Continued)

OTHER PUBLICATIONS

Office Action dated Feb. 28, 2017 issued by the Japan Patent Office in counterpart Japanese Application No. 2015-231247, with concise explanation, 4 pages.

*Primary Examiner* — Pablo Tran
(74) *Attorney, Agent, or Firm* — Procopio Cory Hargreaves and Savitch LLP (57) ABSTRACT

An electronic device includes a housing component which includes a through hole which passes between a first surface and a second surface, an antenna as a conductor film located to cover a part of a surface of the housing component, and a filler which watertightly seals the through hole by filling at least a part of an internal space in the through hole. The antenna includes an antenna first portion as a conductor film first portion, an antenna second portion as a conductor film second portion, and an antenna third portion as a conductor film portion which covers at least a part of an inner surface of the through hole. The through hole includes a through hole first portion and the through hole first portion includes a step in an intermediate portion thereof. The step is covered with the filler when the through hole is viewed from the first surface.

8 Claims, 11 Drawing Sheets

(56) References Cited

U.S. PATENT DOCUMENTS

| | | | | |
|---|---|---|---|---|
| 7,263,032 | B2* | 8/2007 | Polany | H04R 1/44 |
| | | | | 367/131 |
| 7,764,933 | B2* | 7/2010 | Tempelman | H04M 1/0277 |
| | | | | 174/350 |
| 7,764,936 | B2* | 7/2010 | Nakasono | G07C 9/00944 |
| | | | | 200/302.2 |
| 9,213,370 | B2* | 12/2015 | Yamaguchi | C09J 7/02 |
| 2011/0021164 | A1* | 1/2011 | Perriello | H01H 13/06 |
| | | | | 455/90.3 |
| 2011/0045882 | A1* | 2/2011 | Yamaguchi | H04M 1/0216 |
| | | | | 455/575.8 |
| 2012/0322516 | A1* | 12/2012 | Kitagawa | F16J 15/025 |
| | | | | 455/575.1 |
| 2015/0289401 | A1 | 10/2015 | Hikino | |

FOREIGN PATENT DOCUMENTS

| | | |
|---|---|---|
| JP | 2014-082683 A | 5/2014 |
| JP | 2014-155064 A | 8/2014 |

* cited by examiner

ELECTRONIC DEVICE AND METHOD OF MANUFACTURING THE SAME

CROSS-REFERENCE TO RELATED APPLICATION

The present application claims priority under 35 U.S.C. §119 to Japanese Patent Application No. 2015-231247 filed on Nov. 27, 2015, entitled "Electronic Device and Method of Manufacturing the Same." The content of which is incorporated by reference herein in its entirety.

FIELD

The present disclosure relates to an electronic device and a method of manufacturing the same.

BACKGROUND

A portable terminal represents one type of electronic devices. A structure of an antenna in a portable terminal for achieving reception performance while waterproof performance is ensured has been known.

SUMMARY

An electronic device based on the present disclosure includes a housing component including a first surface and a second surface on opposite sides and a through hole which passes between the first surface and the second surface, a conductor film located to cover a part of a surface of the housing component, and a filler which watertightly seals the through hole by filling at least a part of an internal space in the through hole. The conductor film includes a conductor film first portion which extends to cover a part of the first surface, a conductor film second portion which extends to cover a part of the second surface, and a conductor film third portion which connects the conductor film first portion and the conductor film second portion to each other via the through hole. The conductor film third portion covers at least a part of an inner surface of the through hole. The through hole includes a through hole first portion. The through hole first portion includes a step in an intermediate portion. The step is covered with the filler when the through hole is viewed from the first surface.

The foregoing and other objects, features, aspects and advantages of the present disclosure will become apparent from the following detailed description of the present disclosure when taken in conjunction with the accompanying drawings.

DETAILED DESCRIPTION

A dimensional ratio shown in the drawings does not necessarily faithfully represent an actual dimensional ratio and a dimensional ratio may be exaggerated for the sake of convenience of description. A concept up or upper and down or lower mentioned in the description below does not mean absolute up or upper or down or lower but may mean relative up or upper or down or lower in terms of a shown position.

An example in which a conductor film connecting the inside and the outside of a waterproof region via a through hole is formed by an antenna will be described below. In the description below, an antenna 1 is shown as an example of a conductor film, and an antenna first portion 11, an antenna second portion 12, and an antenna third portion 13 are shown as examples of a conductor film first portion, a conductor film second portion, and a conductor film third portion, respectively. Description below with an "antenna" being mentioned refers to an antenna merely as one example of a conductor film, and a technique disclosed below may be applicable to a conductor film other than an antenna.

First Embodiment

Figure 1:
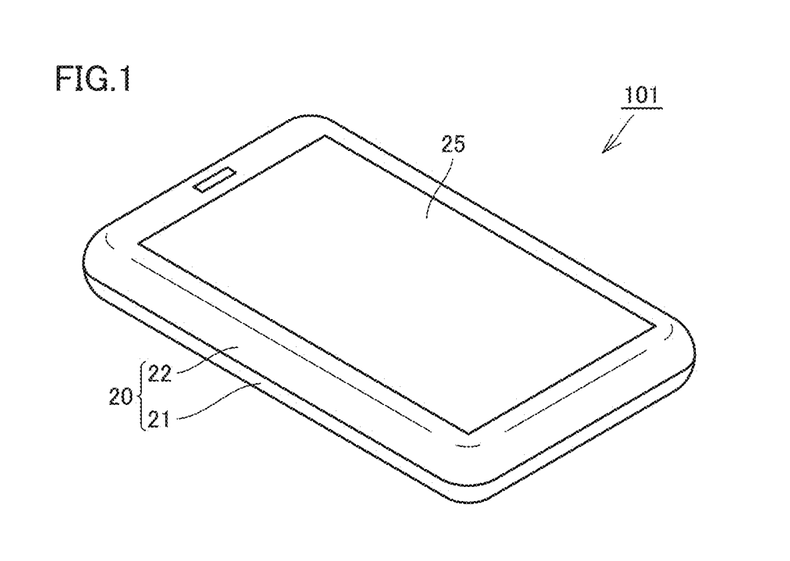
FIG. 1 is a perspective view of an electronic device in a first embodiment based on the present disclosure.

An electronic device in a first embodiment based on the present disclosure will be described with reference to FIGS. 1 to 4. FIG. 1 shows appearance of an electronic device 101 in the first embodiment. Though electronic device 101 is described here as a portable telephone, it is merely by way of example and electronic device 101 is not limited to a portable telephone. Various types of devices can be assumed as electronic device 101.

As shown in FIG. 1, electronic device 101 includes a display area 25, for example, on a front side. Display area 25 may also serve as a touch panel. Electronic device 101 includes a housing 20. Housing 20 includes a housing component 21 on a rear side and a housing component 22 on a front side. Housing component 21 may be formed by combining a plurality of parts. This is also applicable to housing component 22. Housing component 21 may be formed of a resin and may be formed by combining a resin and a material other than the resin. This is also applicable to housing component 22. Electronic device 101 may include an exterior component for covering housing 20. The exterior component is attached, for example, for the purpose of protection and decoration.

Figure 2:
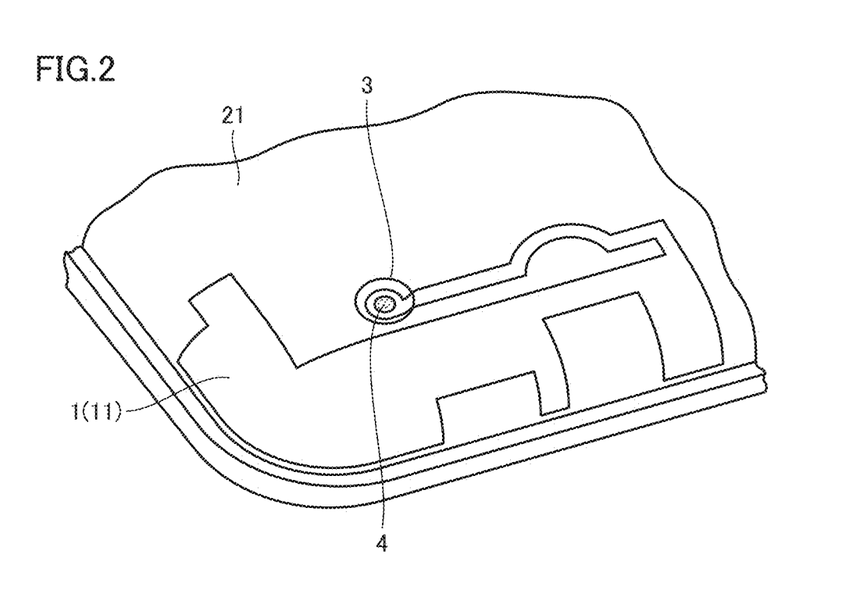
FIG. 2 is a partially enlarged perspective view of the electronic device in the first embodiment based on the present disclosure.

FIG. 2 shows an enlarged view of a part of housing component 21 of electronic device 101. Antenna 1 is located along an outer surface of housing component 21. Antenna 1 is formed from a metal film. Housing component 21 is provided with a through hole 3 and antenna 1 reaches through hole 3. A filler 4 is located in through hole 3. A surface of housing component 21 may be coated. As a result of coverage of antenna 1 by this coating, antenna 1 and filler 4 in through hole 3 may not be seen as clearly as shown in FIG. 2. FIG. 2 shows housing component 21 before coating for the sake of convenience of illustration, which is also applicable to each figure below. An outer surface of housing component 21 may be coated in any manner so as to cover antenna 1 and filler 4. Coating is not shown in each figure.

Figure 3:
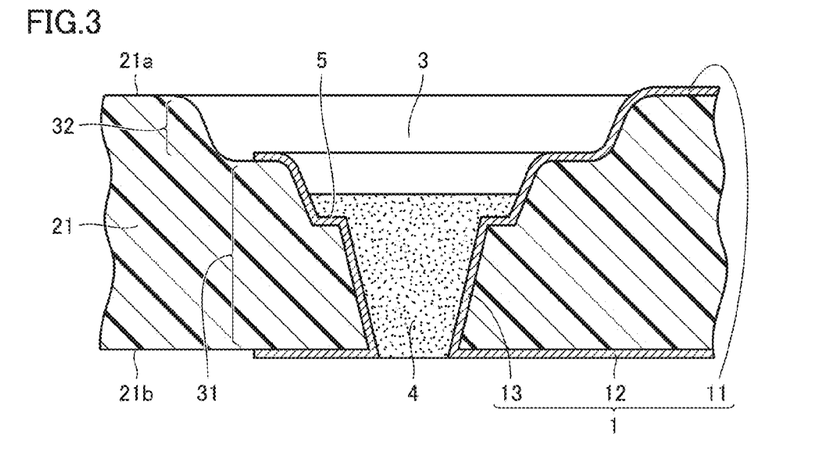
FIG. 3 is a cross-sectional view of a portion in the vicinity of a through hole of the electronic device in the first embodiment based on the present disclosure.
Figure 4:
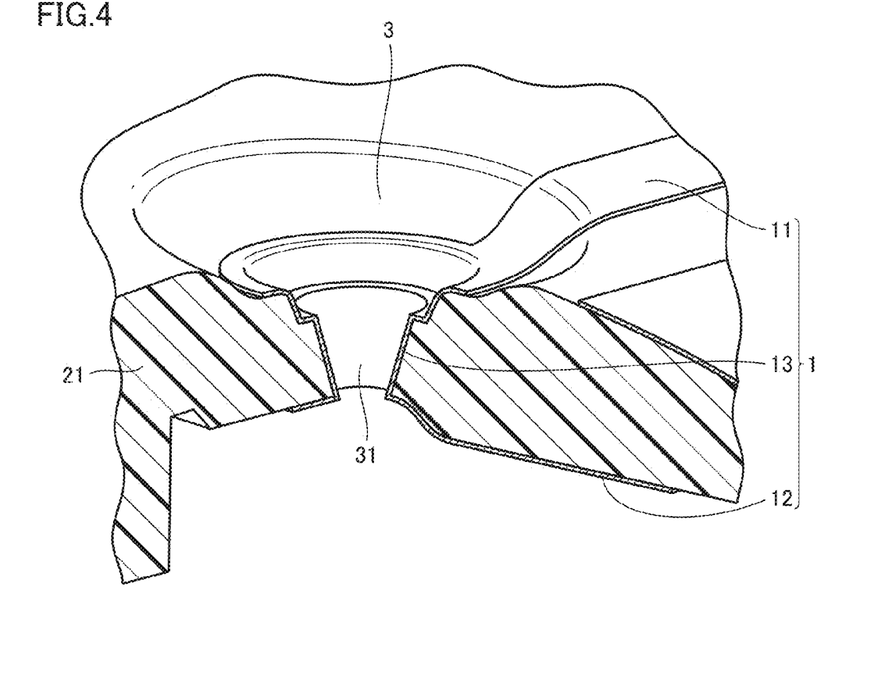
FIG. 4 is a perspective view in which a cross-section of a portion in the vicinity of the through hole of the electronic device in the first embodiment based on the present disclosure can be seen.

FIG. 3 shows a cross-sectional view of a portion in the vicinity of through hole 3. Through hole 3 provided in housing component 21 includes a through hole first portion 31 and a through hole second portion 32. FIG. 4 shows a state that filler 4 has been removed and a part of through hole 3 has been cut away so that a cross-section can be seen.

Electronic device 101 in the present disclosure includes housing component 21 including a first surface 21a and a second surface 21b on opposite sides and through hole 3 passing between first surface 21a and second surface 21b, antenna 1 as a conductor film located to cover a part of the surface of housing component 21, and filler 4 watertightly sealing through hole 3 by filling at least a part of an internal space in through hole 3. Antenna 1 includes an antenna first portion 11 as a conductor film first portion which extends to cover a part of first surface 21a, an antenna second portion 12 as a conductor film second portion which extends to cover a part of second surface 21b, and an antenna third portion 13 as a conductor film third portion connecting antenna first portion 11 and antenna second portion 12 to each other via through hole 3. Antenna third portion 13 covers at least a part of an inner surface of through hole 3. Through hole 3 includes through hole first portion 31. Through hole first portion 31 includes a step 5 in an intermediate portion thereof. Step 5 is covered with filler 4 when through hole 3 is viewed from first surface 21a.

Antenna 1 is formed from a conductor plate or a conductor film. Antenna 1 is formed, for example, from a metal film. Antenna 1 may integrally be formed to include antenna first portion 11, antenna second portion 12, and antenna third portion 13.

In the first embodiment, step 5 is located in through hole 3 of housing component 21 and filler 4 is located to cover step 5. Therefore, it can be confirmed that a sufficient amount of filler 4 is supplied, by visually recognizing step 5 having been hidden. Therefore, this electronic device can reliably obtain sufficient waterproof performance in a portion where the antenna connects the inside and the outside of a waterproof region via the through hole.

Figure 5:
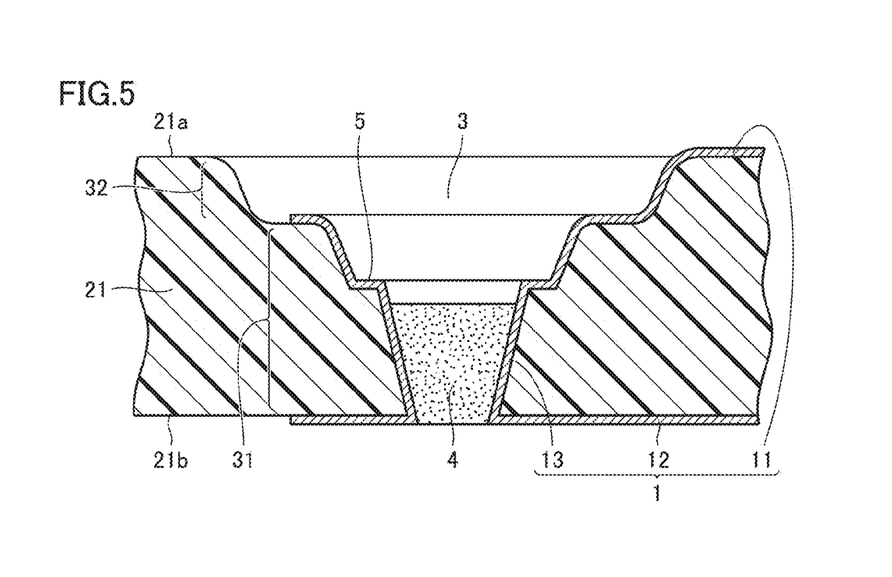
FIG. 5 is a cross-sectional view of the portion in the vicinity of the through hole when an amount of a filler is insufficient in the electronic device in the first embodiment based on the present disclosure.

When an amount of filler 4 injected into through hole 3 is insufficient, a state as shown in FIG. 5 takes place. In this case, step 5 is exposed without being covered with filler 4. In such a state, step 5 is seen, and therefore it can readily be found that filler 4 is insufficient. A product determined as being insufficient in filler 4 can be handled as a defective product.

As shown in the first embodiment, a cross-sectional area of through hole first portion 31 when cut along a plane in parallel to first surface 21a may increase toward first surface 21a. By adopting this construction, a cross-sectional area of through hole first portion 31 increases toward first surface 21a and hence it becomes easier to inject filler 4.

As shown in the first embodiment, through hole first portion 31 may be tapered in a portion other than step 5. This construction is convenient in irradiation of the entire inner surface of through hole 3 with laser beams as will be described later.

Figure 6:
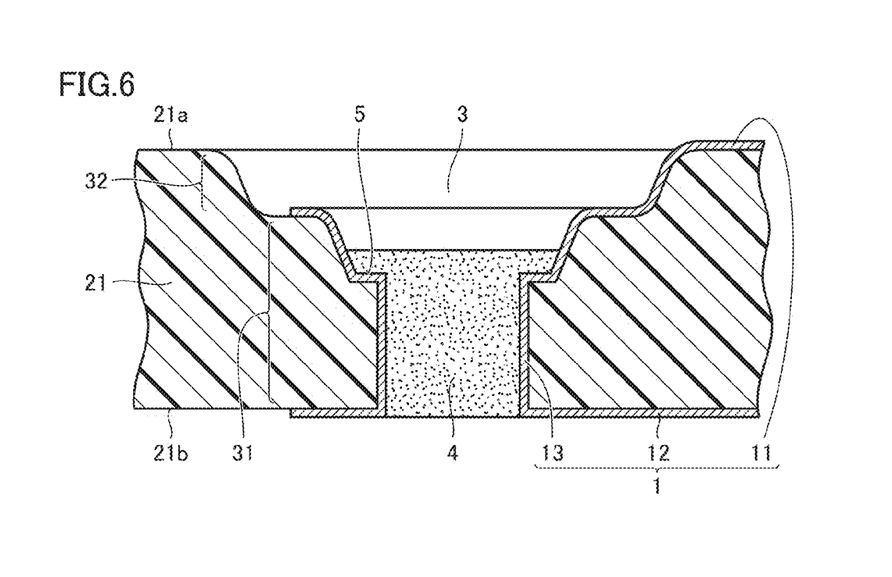
FIG. 6 is a cross-sectional view of the portion in the vicinity of the through hole in a first modification of the electronic component in the first embodiment based on the present disclosure.
Figure 7:
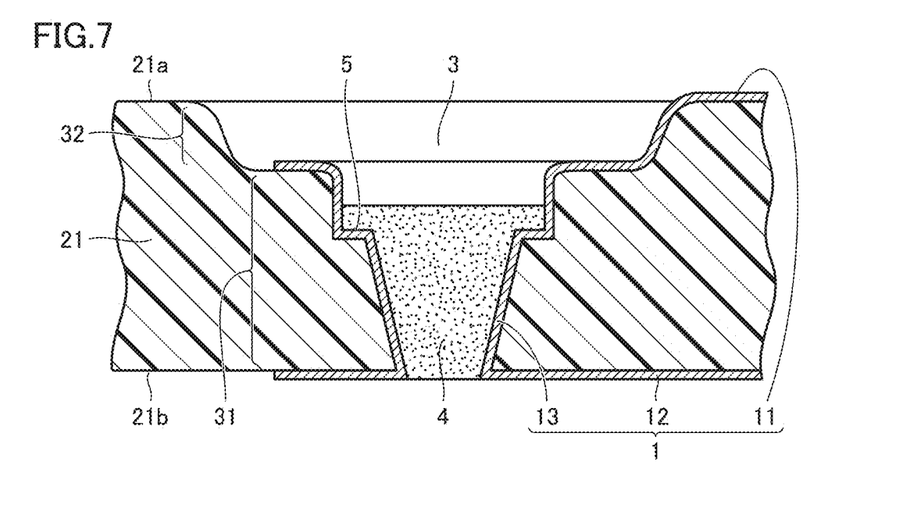
FIG. 7 is a cross-sectional view of the portion in the vicinity of the through hole in a second modification of the electronic component in the first embodiment based on the present disclosure.
Figure 8:
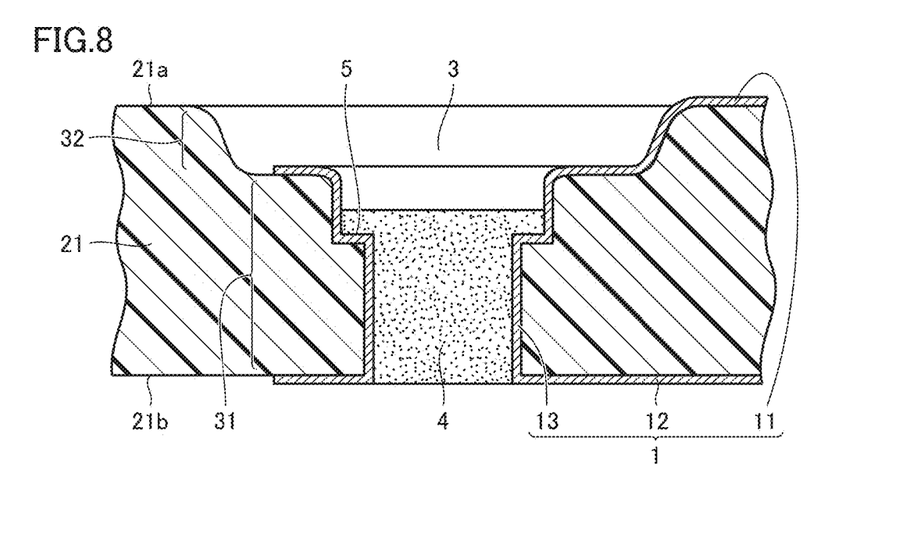
FIG. 8 is a cross-sectional view of the portion in the vicinity of the through hole in a third modification of the electronic component in the first embodiment based on the present disclosure.

Through hole first portion 31 is not always in a shape satisfying such a condition. Through hole first portion 31 may include, for example, a straight portion. For example, as shown in FIG. 6, the through hole first portion may be straight on a side of second surface 21b relative to step 5 and may be tapered on a side of first surface 21a relative to step 5. For example, as shown in FIG. 7, the through hole first portion may be straight on the side of first surface 21a relative to step 5 and may be tapered on the side of second surface 21b relative to step 5. For example, as shown in FIG. 8, the through hole first portion may be straight in a portion other than step 5. Even with the constructions shown in FIGS. 6 to 8, it can be confirmed that a sufficient amount of filler 4 has been supplied, by visually recognizing step 5 having been hidden, and hence an effect described in the first embodiment can be obtained.

Figure 9:
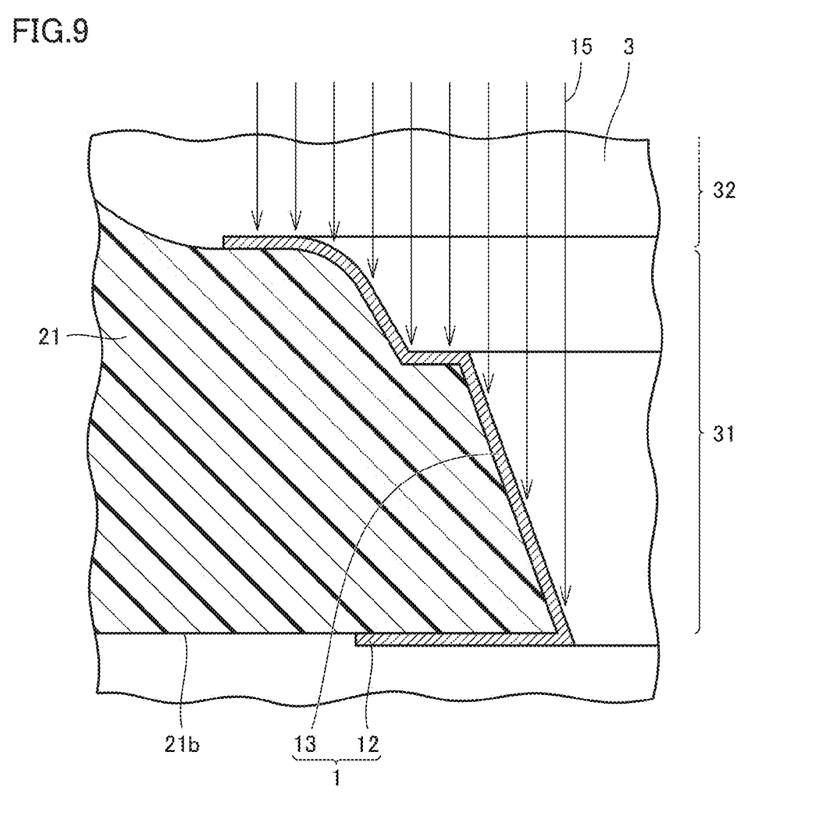
FIG. 9 is a diagram illustrating irradiation of the through hole of the electronic device in the first embodiment based on the present disclosure with laser beams.

As shown in the first embodiment, antenna third portion 13 may cover the entire inner circumferential surface of through hole 3. By adopting this construction, antenna third portion 13 can be located over a wide area and portions of antenna 1 located inside and outside the housing can electrically be connected to each other in a stable manner. A known technique such as laser direct structuring (LDS) can be adopted for forming antenna 1 so as to cover the inner surface of through hole 3. For example, with LDS, a metal film can be formed along a surface of a resin member by irradiating a desired region of the surface of the resin member with laser beams. To that end, irradiation with laser beams is required. By shaping any portion of through hole 3 as being tapered without providing a straight portion, the entire inner surface of through hole 3 can be irradiated from above with laser beams. For example, as shown in FIG. 9, the entire desired region of the inner surface of through hole 3 is desirably irradiated with laser beams 15. Thus, with LDS, antenna 1 can be formed so as to cover a desired area of the inner surface of through hole 3. In the example shown in FIG. 9, antenna second portion 12 of antenna 1 which covers second surface 21b is desirably formed by irradiating that portion from below with laser beams.

As shown in the first embodiment, through hole 3 may include through hole second portion 32 (see FIG. 3) greater in diameter than through hole first portion 31, which is recessed in first surface 21a on the side of first surface 21a relative to through hole first portion 31. By adopting this construction, a portion where antenna 1 enters through hole 3 and filler 4 can be protected against collision and the like on the outside of housing component 21.

Filler 4 may be opaque. By adopting this feature, whether or not filler 4 covers step 5 can outwardly readily be seen. In this case, it is not necessary to be conscious about presence of filler 4 itself in determining whether or not an amount of filler 4 is sufficient, and it is only necessary to determine whether or not step 5 is seen.

Figure 10:
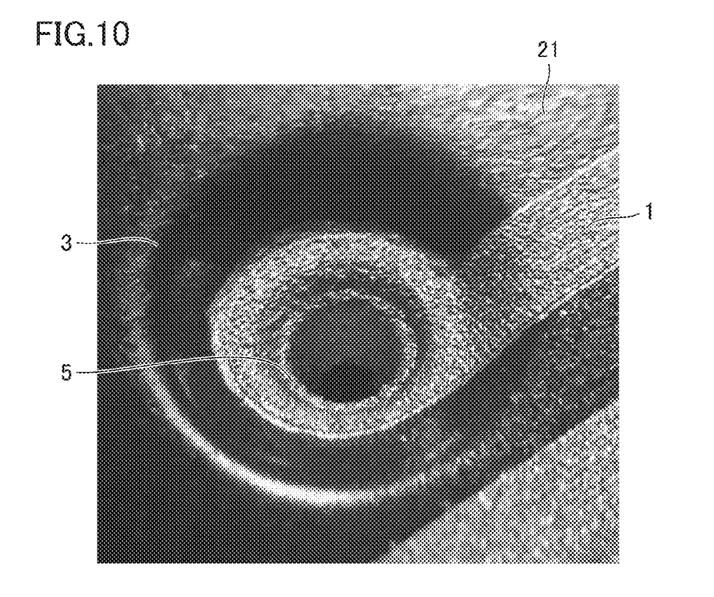
FIG. 10 shows a photograph of a portion in the vicinity of the through hole before injection of the filler in a housing component prepared for manufacturing the electronic device in the first embodiment based on the present disclosure.

FIG. 10 shows a photograph of a portion in the vicinity of through hole 3 before injection of filler 4. Step 5 is seen in through hole 3. Antenna 1 is formed to cover a part of the inner surface of through hole 3 and to further continue to the outside of through hole 3.

Figure 11:
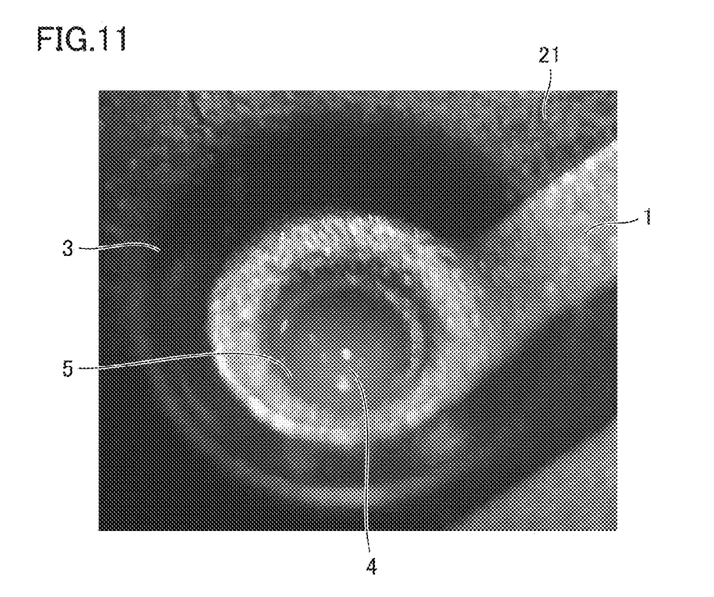
FIG. 11 shows a photograph of a portion in the vicinity of the through hole when an amount of injection of the filler is insufficient in the housing component prepared for manufacturing the electronic device in the first embodiment based on the present disclosure.

FIG. 11 shows a photograph of a portion in the vicinity of through hole 3 in a state that an amount of filler 4 is insufficient although injection of filler 4 has been completed. It can be seen that filler 4 is located in through hole 3. Step 5 in through hole 3 is also seen. Step 5 may slightly be covered with filler 4. When step 5 covers filler 4 and when a thickness thereof is nevertheless small and step 5 can be seen through the filler, it may be determined that an amount of injected filler 4 is insufficient.

Figure 12:
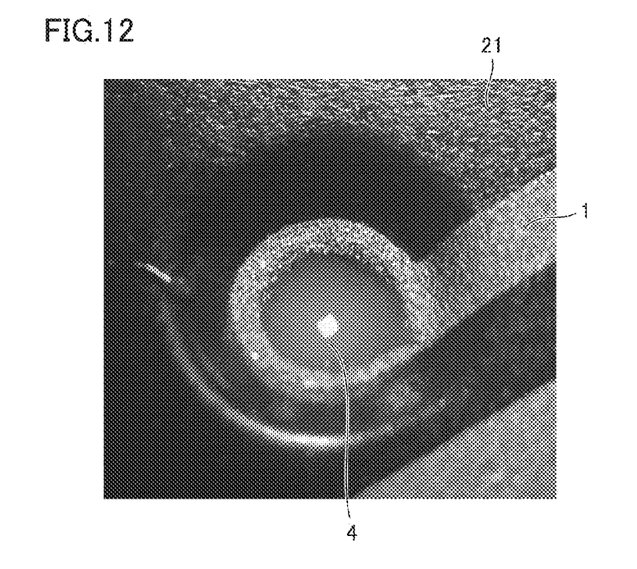
FIG. 12 shows a photograph of a portion in the vicinity of the through hole when an amount of injection of the filler is sufficient in the housing component prepared for manufacturing the electronic device in the first embodiment based on the present disclosure.

FIG. 12 shows a photograph of a portion in the vicinity of through hole 3 in a state that injection of filler 4 has been completed and an amount of filler 4 has sufficiently reached a proper amount. Though filler 4 located in through hole 3 can be seen, step 5 in through hole 3 is not seen.

Figure 13:
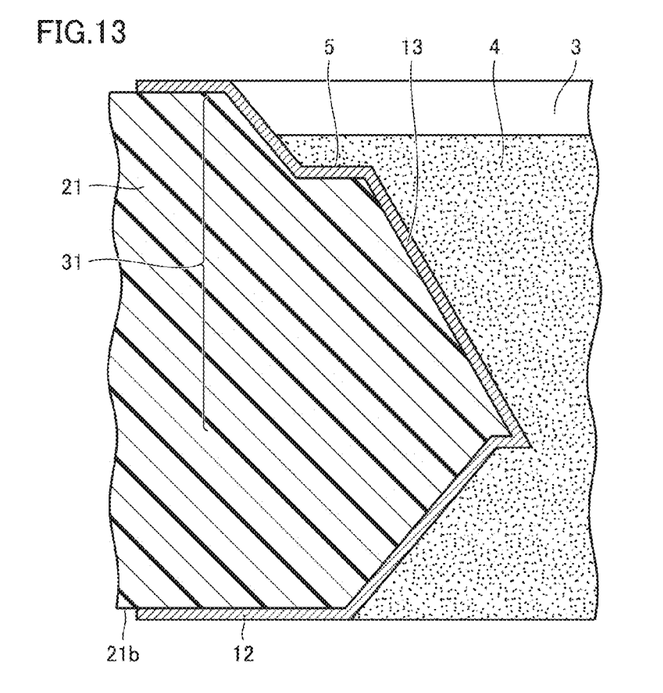
FIG. 13 is a partially enlarged cross-sectional view of a portion in the vicinity of the through hole in a modification of the electronic device in the first embodiment based on the present disclosure.

In the first embodiment, as shown in FIG. 5, a structure is such that a direction of a taper of each portion of through hole 3 is the same and the through hole is wider toward first surface 21a. The structure of through hole 3 is not limited as such. For example, as shown in FIG. 13, a part of through hole 3 may be inverse-tapered. FIG. 13 shows through hole first portion 31 which is a part of through hole 3, and an inverse-tapered portion continues to the through hole first portion 31 on a side of second surface 21b relative to through hole first portion 31. With such a construction, in forming antenna 1 on the inner surface of through hole 3 with a manufacturing method requiring irradiation with laser beams as in LDS, the through hole is desirably irradiated with laser beams from both of the side of first surface 21a and the side of second surface 21b.

Second Embodiment

Figure 14:
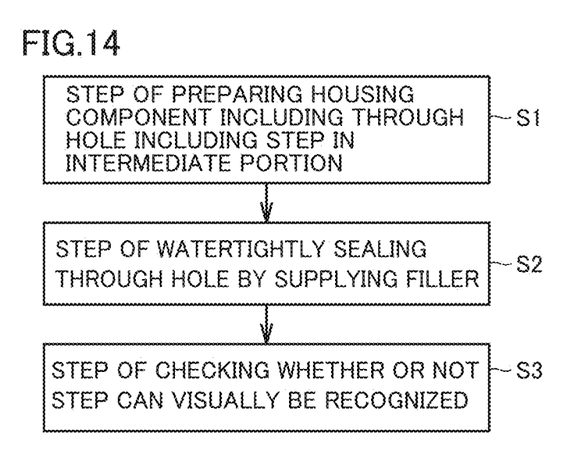
FIG. 14 is a flowchart of a method of manufacturing an electronic device in a second embodiment based on the present disclosure.

A method of manufacturing an electronic device in a second embodiment based on the present disclosure will be described with reference to FIGS. 14 to 18. FIG. 14 shows a flowchart of the method of manufacturing an electronic device in the second embodiment.

The method of manufacturing an electronic device in the second embodiment includes a step S1 of preparing a housing component including a first surface and a second surface on opposite sides and a through hole which passes between the first surface and the second surface, the through hole including a through hole first portion, at least a part of an inner surface of the through hole being covered with an antenna as a conductor film, and the through hole first portion including a step in an intermediate portion, a step S2 of watertightly sealing the through hole by supplying a filler into the through hole from a side of the first surface, and a step S3 of checking whether or not the step can visually be recognized from the side of the first surface. Each step will be described below in detail with reference to the drawings.

Figure 15:
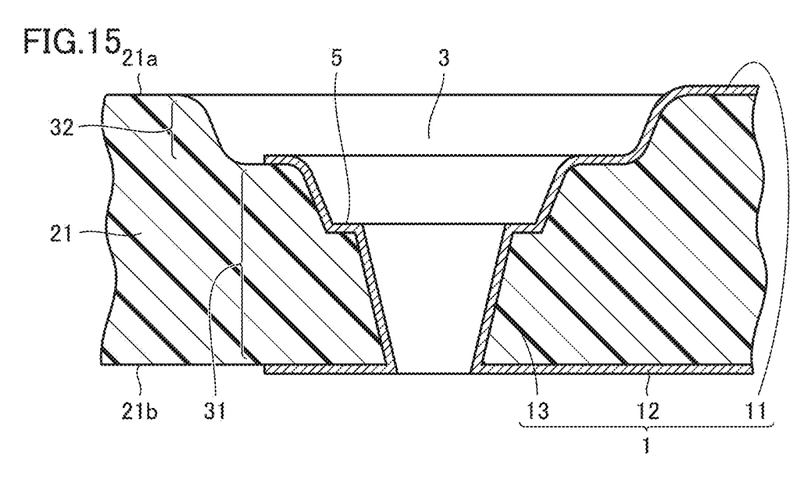
FIG. 15 is a diagram illustrating a first step in the method of manufacturing an electronic device in second and third embodiments based on the present disclosure.

Initially, in step S1, for example, housing component 21 as shown in FIG. 15 is prepared. Housing component 21 includes first surface 21a and second surface 21b on opposite sides and through hole 3 which passes between first surface 21a and second surface 21b. Through hole 3 includes through hole first portion 31. A cross-sectional area of through hole first portion 31 when cut along a plane in parallel to first surface 21a increases toward first surface 21a. Through hole first portion 31 may be tapered in a portion other than step 5. At least a part of the inner surface of through hole 3 is covered with antenna 1 and through hole first portion 31 includes step 5 in an intermediate portion.

Figure 16:
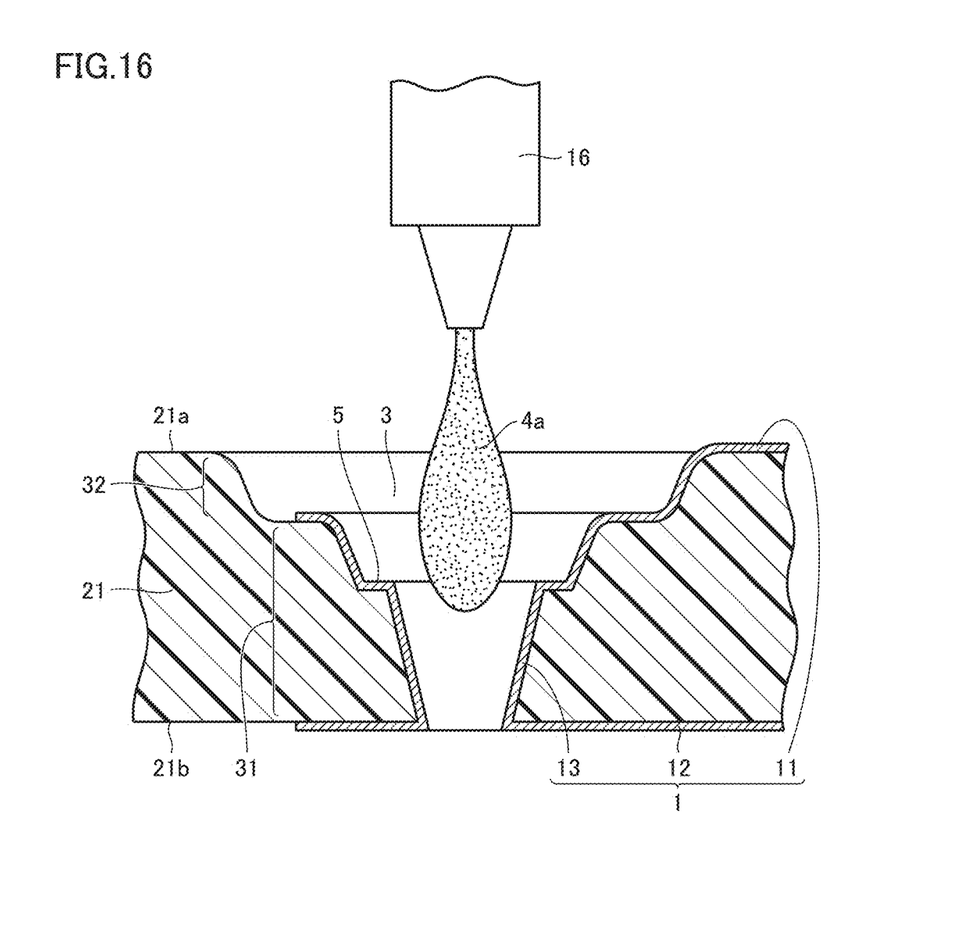
FIG. 16 is a diagram illustrating a second step in the method of manufacturing an electronic device in the second embodiment based on the present disclosure.

In step S2, as shown in FIG. 16, through hole 3 is watertightly sealed by supplying a filler 4a into through hole 3 from the side of first surface 21a. Filler 4a is supplied, for example, by a dispenser 16.

Figure 17:
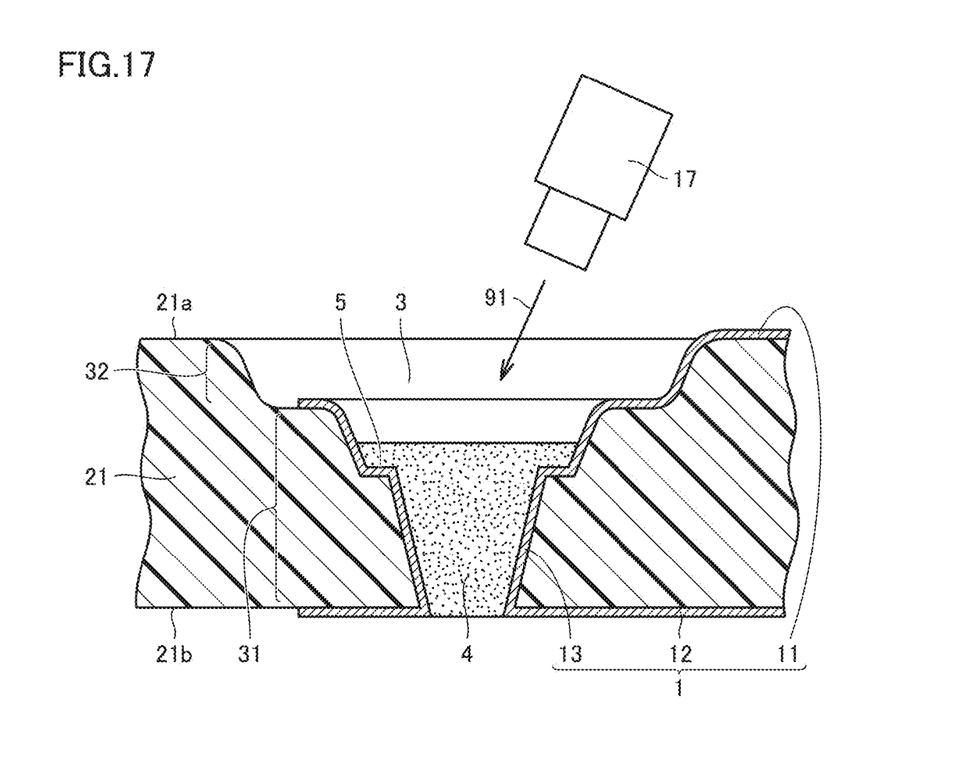
FIG. 17 is a diagram illustrating a third step in the method of manufacturing an electronic device in the second embodiment based on the present disclosure.

In step S3, whether or not step 5 can visually be recognized from the side of first surface 21a is checked as shown in FIG. 17. In the example shown in FIG. 17, through hole 3 is observed as shown with an arrow 91, with the use of an image pick-up apparatus 17. Image pick-up apparatus 17 includes a camera. It can be determined that application of the filler is insufficient when step 5 can visually be recognized. When step 5 cannot visually be recognized, it can be determined that a sufficient amount of filler has been applied. In step S3, an image shot by image pick-up apparatus 17 may automatically be processed and a computer may determine whether or not step 5 is seen in the image. Though an example in which image pick-up apparatus 17 is employed in step S3 is shown here, in step S3, whether or not step 5 is seen may be determined based on checking by an operator with naked eyes instead of image pick-up apparatus 17. Alternatively, whether or not step 5 is seen may be determined by an operator who observes through hole 3 with the use of such an instrument as a microscope and a magnifier.

In the second embodiment, whether or not an amount of filler supplied in step S2 is sufficient can be determined by checking in step S3 after through hole 3 is watertightly sealed in step S2. Therefore, if there is any defective product due to insufficiency in filler, the defective product can be found and excluded. Electronic devices can thus be manufactured such that defective products caused by insufficiency in filler are not included. Thus, the method of manufacturing an electronic device in the second embodiment can be a method of manufacturing an electronic device which can reliably obtain sufficient waterproof performance in a portion where the antenna of the electronic device connects the inside and the outside of a waterproof region via a through hole.

Third Embodiment

Figure 18:
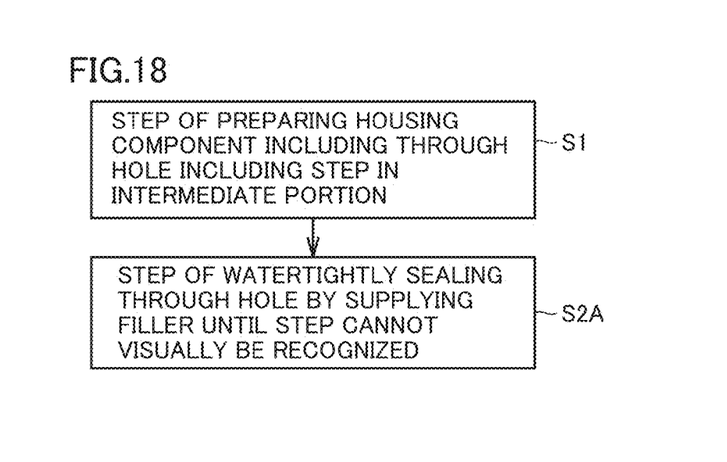
FIG. 18 is a flowchart of a method of manufacturing an electronic device in the third embodiment based on the present disclosure.

A method of manufacturing an electronic device in a third embodiment based on the present disclosure will be described with reference to FIGS. 15 and 18 to 19. FIG. 18 shows a flowchart of the method of manufacturing an electronic device in the third embodiment.

The method of manufacturing an electronic device in the third embodiment includes step S1 of preparing a housing component including a first surface and a second surface on opposite sides and a through hole which passes between the first surface and the second surface, the through hole including a through hole first portion, at least a part of an inner surface of the through hole being covered with an antenna as a conductor film, and the through hole first portion including a step in an intermediate portion, and a step S2A of watertightly sealing the through hole by supplying a filler into the through hole from the side of the first surface until the step can no longer be visually recognized from the side of the first surface. Each step will be described below in detail with reference to the drawings.

Step S1 is initially performed. Step S1 is the same as described in the second embodiment. For example, housing component 21 as shown in FIG. 15 is prepared.

Figure 19:
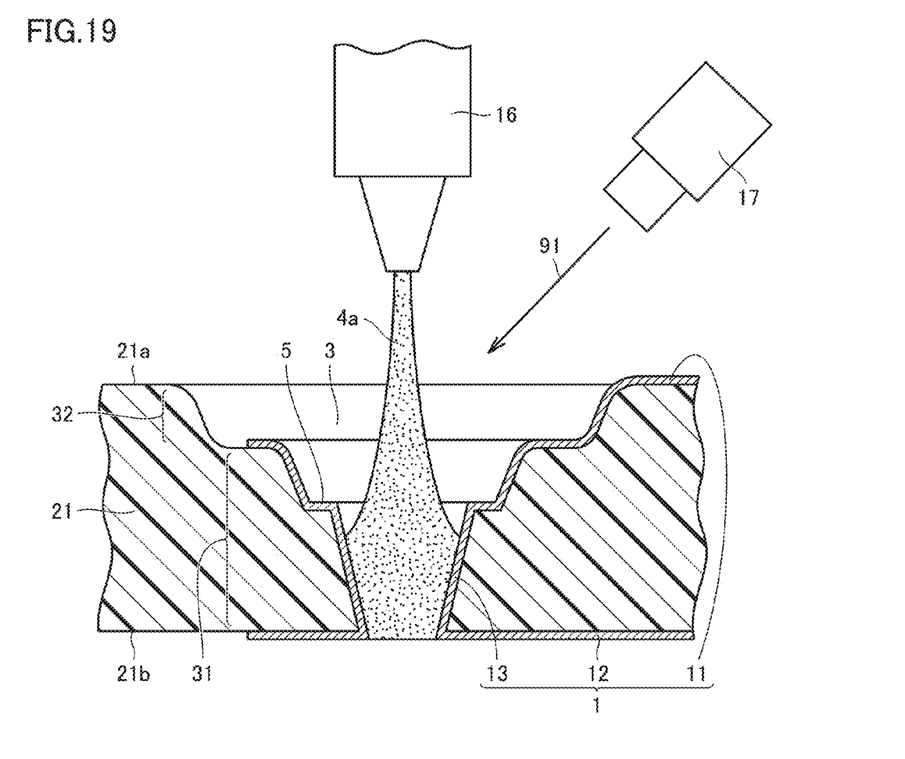
FIG. 19 is a diagram illustrating a second step in the method of manufacturing an electronic device in the third embodiment based on the present disclosure.

In step S2A, as shown in FIG. 19, through hole 3 is watertightly sealed by supplying filler 4a into through hole 3 from the side of first surface 21a until step 5 can no longer be visually recognized from the side of first surface 21a. In the example shown in FIG. 19, filler 4a is supplied by dispenser 16 while through hole 3 is observed as shown with arrow 91 with the use of image pick-up apparatus 17 directed to through hole 3. Image pick-up apparatus 17 includes a camera. When step 5 can visually be recognized, it can be determined that filler 4a has not sufficiently been applied and supply of filler 4a should further be continued. When step 5 cannot visually be recognized, it can be determined that a sufficient amount of filler has already been applied and supply of filler 4a by dispenser 16 should be stopped. In step S2A, an image shot by image pick-up apparatus 17 may automatically be processed and a computer may determine whether or not step 5 is seen in the image. Though an example in which image pick-up apparatus 17 is employed in step S2A is shown here, in step S2A, whether or not step 5 is seen may be determined based on checking by an operator with naked eyes instead of image pick-up apparatus 17. Alternatively, whether or not step 5 is seen may be determined by an operator who observes through hole 3 with the use of such an instrument as a microscope and a magnifier. In determining whether or not step 5 is seen based on observation by an operator, the operator may also manually operate dispenser 16.

In the third embodiment, when through hole 3 is watertightly sealed in step S2A, through hole 3 is concurrently observed. Supply of filler 4a can be stopped based on a criterion "until the step can no longer be visually recognized from the side of the first surface," and therefore, production of a defective product due to insufficiency in filler is extremely less likely. Thus, the method of manufacturing an electronic device in the third embodiment can be a method of manufacturing an electronic device which can reliably obtain sufficient waterproof performance in a portion where the antenna of the electronic device connects the inside and the outside of a waterproof region via a through hole.

A structure of dispenser 16 shown in the second and third embodiments is merely by way of example, and it is not limited to the illustrated structure. A form of filler 4a which is moving as shown in FIGS. 16 and 19 is schematically shown merely for illustration, and it is not limited to the form as such.

Some features in embodiments above may be adopted as being combined as appropriate.

Though description has been given so far by using the term "electronic device," the electronic device is a broad concept covering, for example, a portable telephone, a portable information terminal, a tablet terminal, a personal computer, a game console, a television receiver, a portable music player, a CD player, a DVD player, an electronic calculator, an electronic organizer, an electronic dictionary, an electronic book reader, a digital camera, a video camera, a radio receiver, a navigation system, and a measurement instrument. The concept of the portable telephone or the portable information terminal includes a smartphone.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

The invention claimed is:

1. An electronic device comprising:
a housing component which includes a first surface and a second surface on opposite sides and a through hole which passes between the first surface and the second surface;
a conductor film located to cover a part of a surface of the housing component; and
a filler which watertightly seals the through hole by filling at least a part of an internal space in the through hole,
the conductor film including a conductor film first portion which extends to cover a part of the first surface, a conductor film second portion which extends to cover a part of the second surface, and a conductor film third portion which connects the conductor film first portion and the conductor film second portion to each other via the through hole, the conductor film third portion covering at least a part of an inner surface of the through hole,
the through hole including a through hole first portion, the through hole first portion including a step in an intermediate portion, and
the step being covered with the filler when the through hole is viewed from the first surface.

2. The electronic device according to claim 1, wherein a cross-sectional area of the through hole first portion when cut along a plane in parallel to the first surface increases toward the first surface.

3. The electronic device according to claim 2, wherein the through hole first portion is tapered in a portion other than the step.

4. The electronic device according to claim 1, wherein the conductor film third portion covers an entire inner circumferential surface of the through hole.

5. The electronic device according to claim 1, wherein the through hole includes a through hole second portion greater in diameter than the through hole first portion, which is recessed in the first surface on a side of the first surface relative to the through hole first portion.

6. The electronic device according to claim 1, wherein the filler is opaque.

7. A method of manufacturing an electronic device, the method comprising:
preparing a housing component including a first surface and a second surface on opposite sides and a through hole which passes between the first surface and the second surface, the through hole including a through hole first portion, at least a part of an inner surface of the through hole being covered with a conductor film, and the through hole first portion including a step in an intermediate portion;

watertightly sealing the through hole by supplying a filler into the through hole from a side of the first surface; and checking whether the step can visually be recognized from the side of the first surface.

8. A method of manufacturing an electronic device, the method comprising:

preparing a housing component including a first surface and a second surface on opposite sides and a through hole which passes between the first surface and the second surface, the through hole including a through hole first portion, at least a part of an inner surface of the through hole being covered with a conductor film, and the through hole first portion including a step in an intermediate portion; and watertightly sealing the through hole by supplying a filler into the through hole from a side of the first surface until the step can no longer be visually recognized from the side of the first surface.

\* \* \* \* \*